(12) United States Patent
Hung

(10) Patent No.: US 6,808,313 B1  
(45) Date of Patent: Oct. 26, 2004

(54) ADHESION FREE OPTICAL FIBER CONNECTOR

(76) Inventor: Chen-Hung Hung, No. 26, Lane 88, Fu-Hsing, Chia-I Hsien (TW)

( * ) Notice: Subject to any disclaimer, the term of this patent is extended or adjusted under 35 U.S.C. 154(b) by 0 days.

(21) Appl. No.: 10/628,269

(22) Filed: Jul. 29, 2003

(51) Int. Cl.$^7$ .................................................. G02B 6/36
(52) U.S. Cl. ............................ 385/81; 385/62; 385/87
(58) Field of Search .............................. 385/81, 87, 62

(56) References Cited

U.S. PATENT DOCUMENTS

| | | | | |
|---|---|---|---|---|
| 4,208,093 A | * | 6/1980 | Borsuk ....................... | 385/85 |
| 4,529,230 A | * | 7/1985 | Fatula, Jr. ................... | 285/341 |
| 4,786,134 A | * | 11/1988 | Fort et al. ................... | 385/85 |

FOREIGN PATENT DOCUMENTS

| | | | | |
|---|---|---|---|---|
| JP | 61116303 A | * | 6/1986 | ............ G02B/6/24 |
| JP | 61226715 A | * | 10/1986 | ............ G02B/6/38 |

* cited by examiner

*Primary Examiner*—Hae Moon Hyeon  
(74) *Attorney, Agent, or Firm*—Troxell Law Office PLLC

(57) ABSTRACT

An optical fiber connector includes a first elongated portion with a first conical head and a first through hole. A second elongated portion has a second through hole defined to correspond to and communicate with the first through hole of the first elongated portion after the first distal end of the second elongated portion is received in the first elongated portion and a second conical head. Two hollow retaining elements respectively have a tapered through hole to correspond to the first and second conical head so that after the first conical head and the second conical head are respectively in a corresponding one of the two retaining elements, a diameter of the first through hole and a diameter of the second through hole are reduced so that a filament of an optical fiber is able to be securely retained inside the first and second through holes.

4 Claims, 6 Drawing Sheets

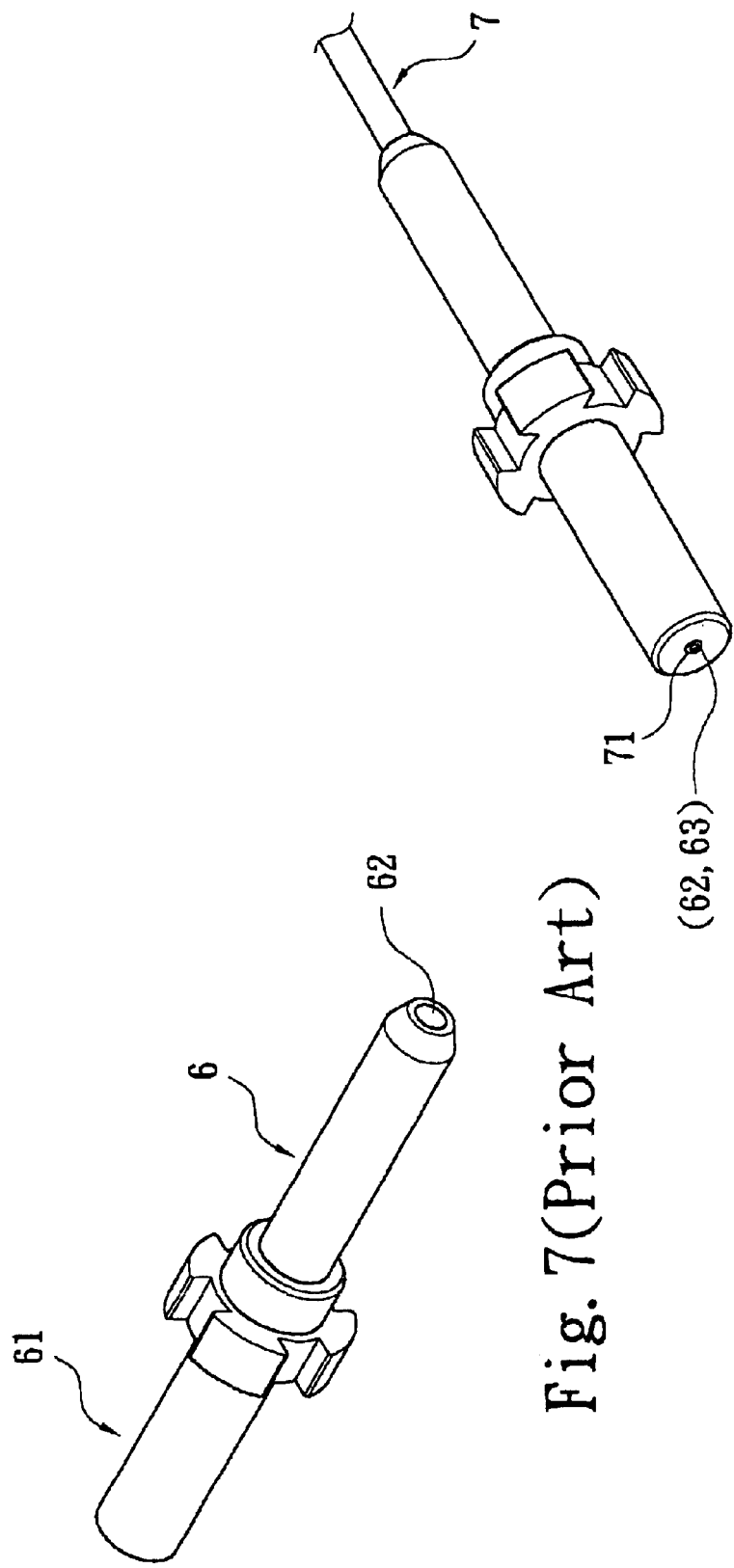

ADHESION FREE OPTICAL FIBER CONNECTOR

BACKGROUND OF THE INVENTION

1. Field of the Invention

The present invention relates to an optical fiber connector, and more particularly to an adhesion free optical connector having a first elongated portion with a first conical head and a second elongated portion securely connected to the first elongated portion and provided with a second conical head such that a retaining element with a conical inner face is able to respectively connect to the first conical head and the second conical head to securely retain the filament of the optical fiber inside the first and second elongated portions.

2. Description of Related Art

With reference to FIGS. 7 and 8, a conventional optical fiber connector is shown and has a first portion (6) and a second portion (61) securely connected to the first portion (6). The optical fiber connector has a through hole (62) defined through the optical fiber connector. When the conventional optical fiber is in use, an optical fiber (7) is prepared and peeled off a portion of the covering at the distal end of the optical fiber (7). After the covering at the distal end of the optical fiber (7) is peeled off to expose the filament (71) inside the optical fiber (7), the optical fiber (7) is inserted into the through hole (62) of the conventional optical fiber connector. However, in order to have the optical fiber (7) to be securely received in the optical fiber connector, before the optical fiber (7) is inserted into the through hole (62), the distal end of the filament (71) is applied with adhesion (63). Besides, the opening of the through hole (62) has a diameter smaller than that of the filament (71) so that the filament (71) is stopped at the opening of the through hole (62) after the optical fiber (7) is inserted into the through hole (62). Thereafter, when the distal end of the optical fiber (7) is inserted into the through hole (62) of the conventional optical fiber connector and reaches the opening of the through hole (62), the distal end of the filament (71) with adhesion (63) applied thereon is stopped by the periphery defining the opening of the through hole (62). Then due to the adhesion (63) on the distal end of the filament (71), the filament (71) is able to be securely received in the optical fiber connector.

However, in the process of inserting the filament (71) into the through hole (62), due to the friction between the filament (71) and the inner face of the through hole (62), the adhesion (63) may be left in the inner face of the through hole (62) and thus causes other portion of the filament (71) to be stained by the adhesion (63), which causes signal bad signal transmission. Also, bubbles may be created in the adhesion (63) due to the friction between the filament (71) and the inner face of the through hole (62), which deviates the filament (71) and results in bad signal transmission as well.

To overcome the shortcomings, the present invention intends to provide an improved optical fiber connector to mitigate or obviate the aforementioned problems.

SUMMARY OF THE INVENTION

The primary objective of the invention is to provide an improved optical fiber connector which is adhesion free so that no stain on the filament and no deviation to cause bad signal transmission.

Other objects, advantages and novel features of the invention will become more apparent from the following detailed description when taken in conjunction with the accompanying drawings.

BRIEF DESCRIPTION OF THE DRAWINGS

FIG. 7 is a perspective view of a conventional optical fiber connector; and

FIG. 8 is a perspective view of the conventional optical fiber connector with the optical fiber inserted therein.

DETAILED DESCRIPTION OF PREFERRED EMBODIMENT

Figure 1:
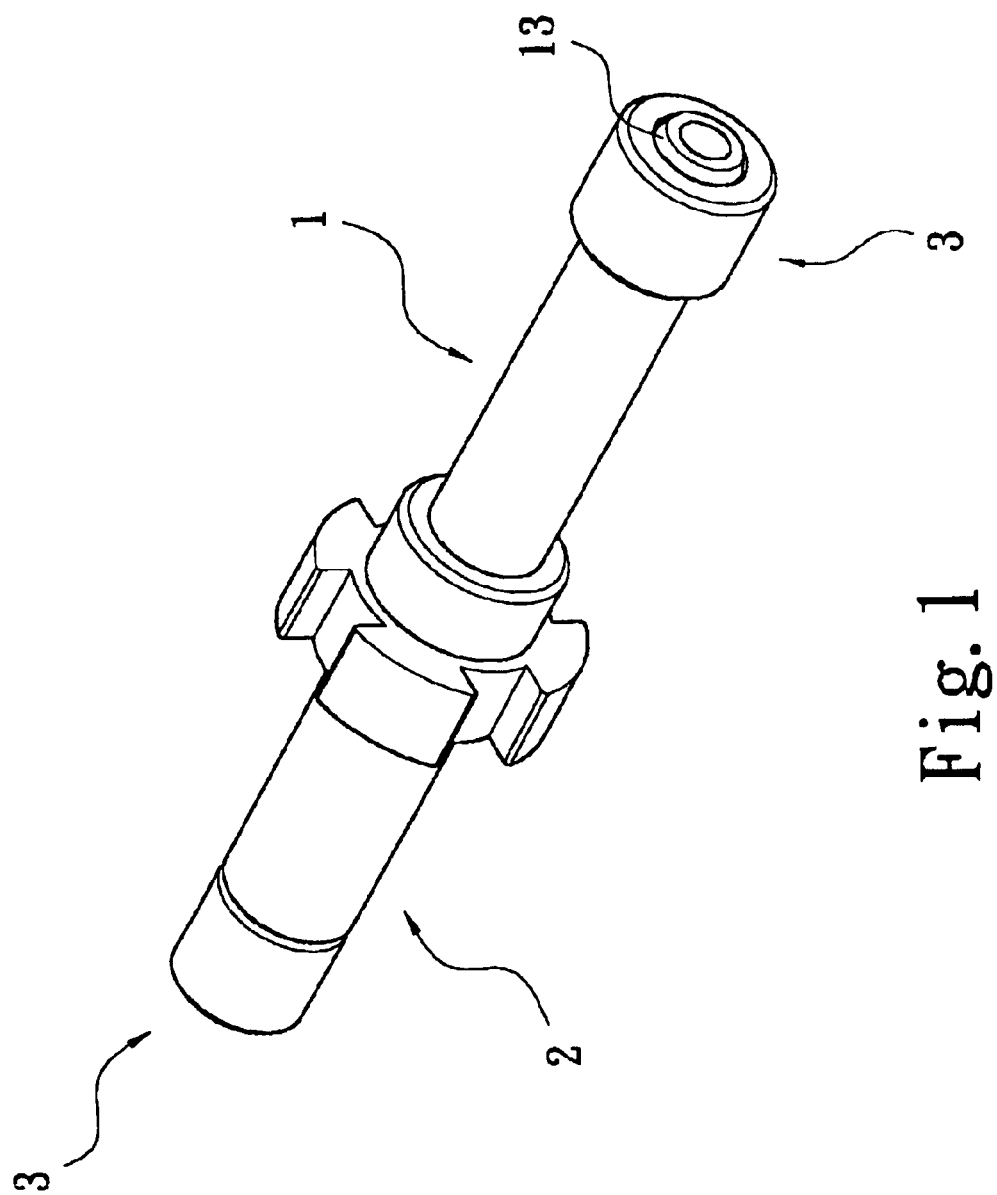
FIG. 1 is a perspective view of the optical fiber connector of the present invention.
Figure 2:
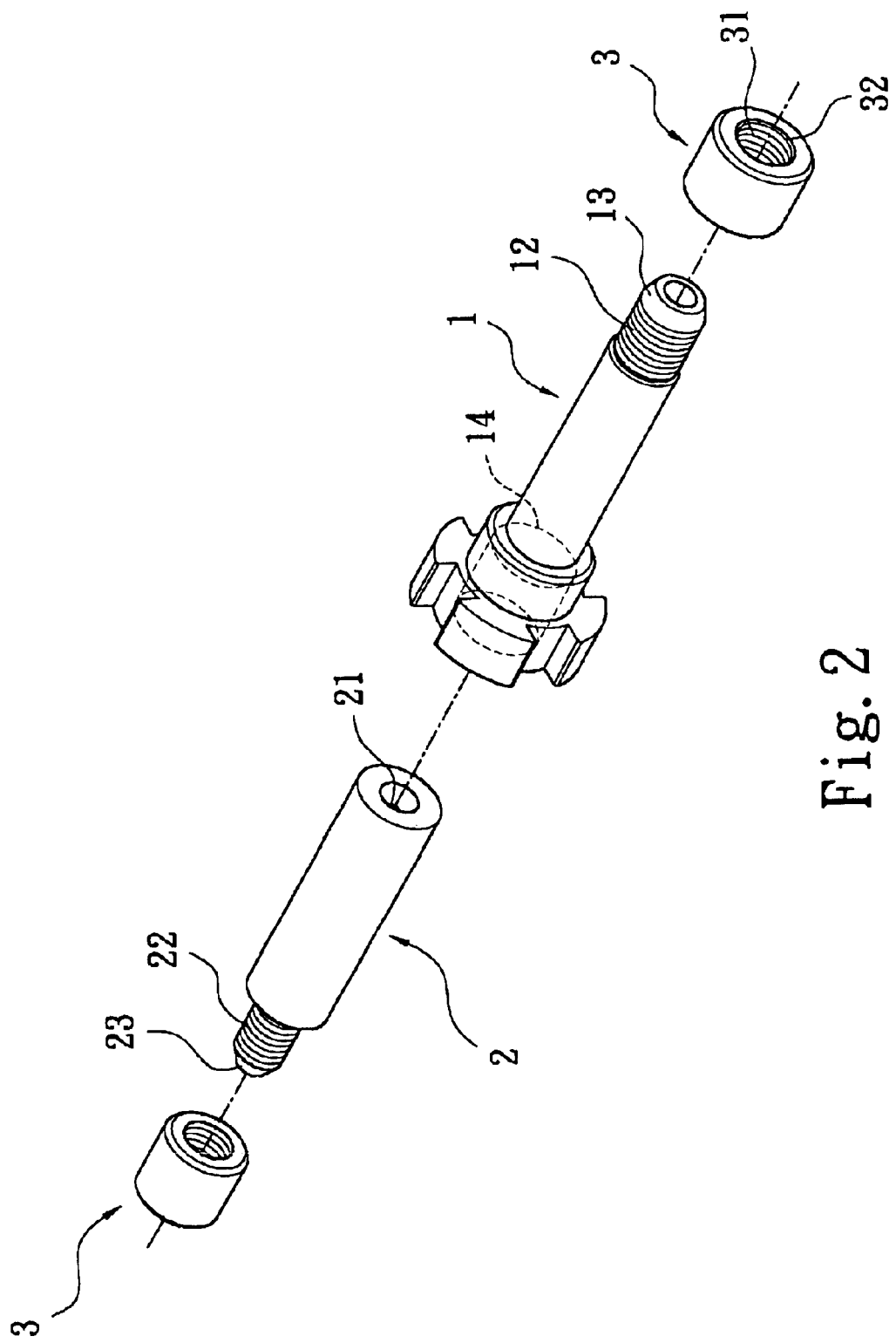
FIG. 2 is an exploded perspective view of the optical fiber connector in FIG. 1.

With reference to FIGS. 1 and 2, the optical fiber connector in accordance with the present invention includes a first elongated portion (1), a second elongated portion (2) and two retaining element (3).

The first elongated portion (1) is hollow and thus has a first through hole (11) defined therein. A first conical head (13) is formed at a first distal end of the first elongated portion (1) and provided with a first outer threading (12) formed on an outer periphery of the first conical head (13). A receiving space (14) is defined in a second distal end inside the first elongated portion (1).

The second elongated portion (2) is also hollow and thus has a second through hole (21) defined therein to communicate with the first through hole (11). A first distal end of the second elongated portion (2) corresponds to the receiving space (14) of the first elongated portion (1). A second distal end of the second elongated portion (2) has a second conical head (23) which has a second outer threading (22) formed on an outer periphery of the second conical head (23).

Each retaining element (3) is hollow and has an inner threading (31) formed inside the retaining element (3) and a tapered through hole (32) to correspond to the first conical head (13) and the second conical head (23) respectively.

When the optical fiber connector of the present invention is in assembly, the first distal end of the second elongated portion (2) is first securely received in the receiving space (14) by any appropriate technique known in the art, such as by supersonic welding. Then the two retaining elements (3) are respectively and threadingly connected to the first conical head (13) and the second conical head (23). Due to the complementary corresponding relationship between the tapered through hole (32) and the first conical head (13) and the tapered through hole (32) and the second conical head (23), after the retaining element (3) is securely and threadingly connected to the first conical head (13) and the second conical head (23), the diameter of both the first through hole (11) and the second through hole (21) are slightly reduced.

Figure 3:
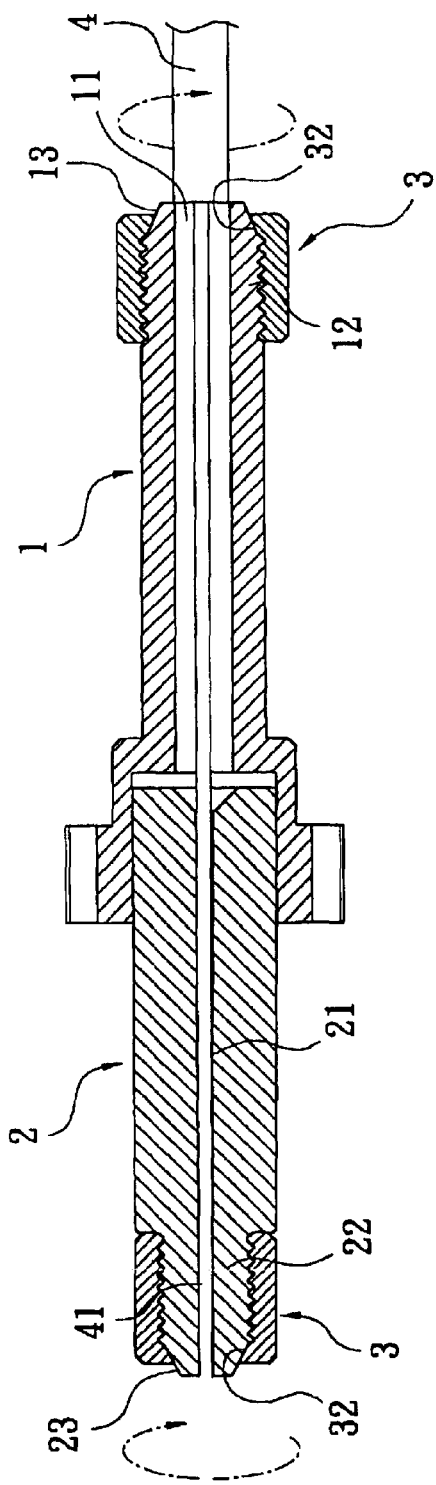
FIG. 3 is a cross sectional view of the optical fiber connector with an optical fiber inserted therein.
Figure 4:
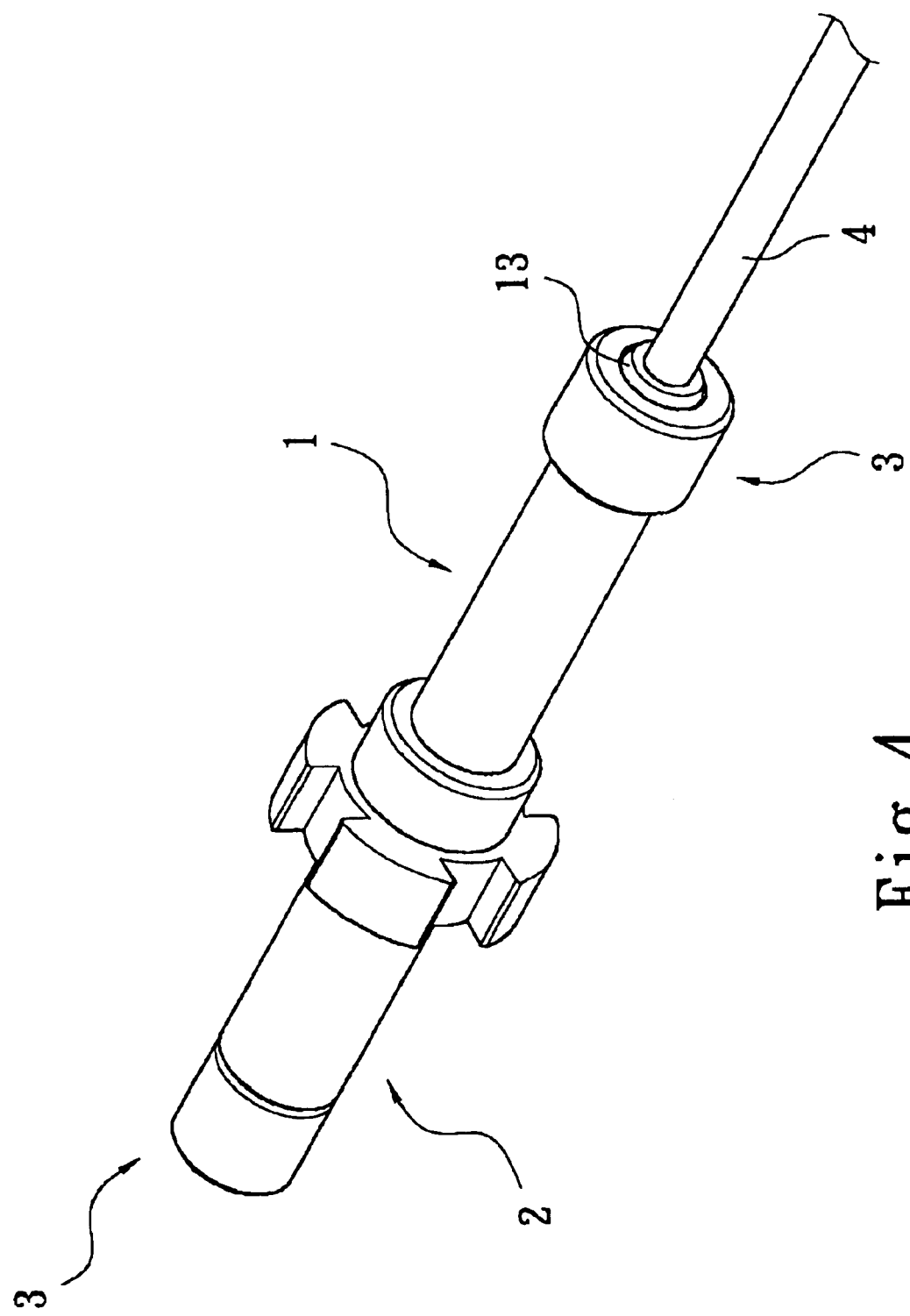
FIG. 4 is a perspective view showing the optical fiber is inserted into the optical fiber connector of the present invention.

With reference to FIGS. 3 and 4, when the optical fiber connector of the present invention is in application with an optical fiber (4), the optical fiber (4) covering is peeled off at the distal end of the optical fiber (4) to expose the filament (41) inside the optical fiber (4). Then the optical fiber (4) is inserted into the optical fiber connector with the first elongated portion (1) connected to the second elongated portion (2). Thereafter, the retaining element (3) is threadingly connected to the first conical head (13) and the second conical head (23) with the inner threading (31) match to the first outer threading (12) and the second outer threading (22) respectively. Because of the design of the first conical head (13) and the second conical head (23), after the retaining elements (3) are connected to the first elongated portion (1) and the second elongated portion (2), the diameter of the first through hole (11) and the second through hole (21) are reduced such that the filament (41) inside the optical fiber connector of the present invention is securely retained.

Figure 5:
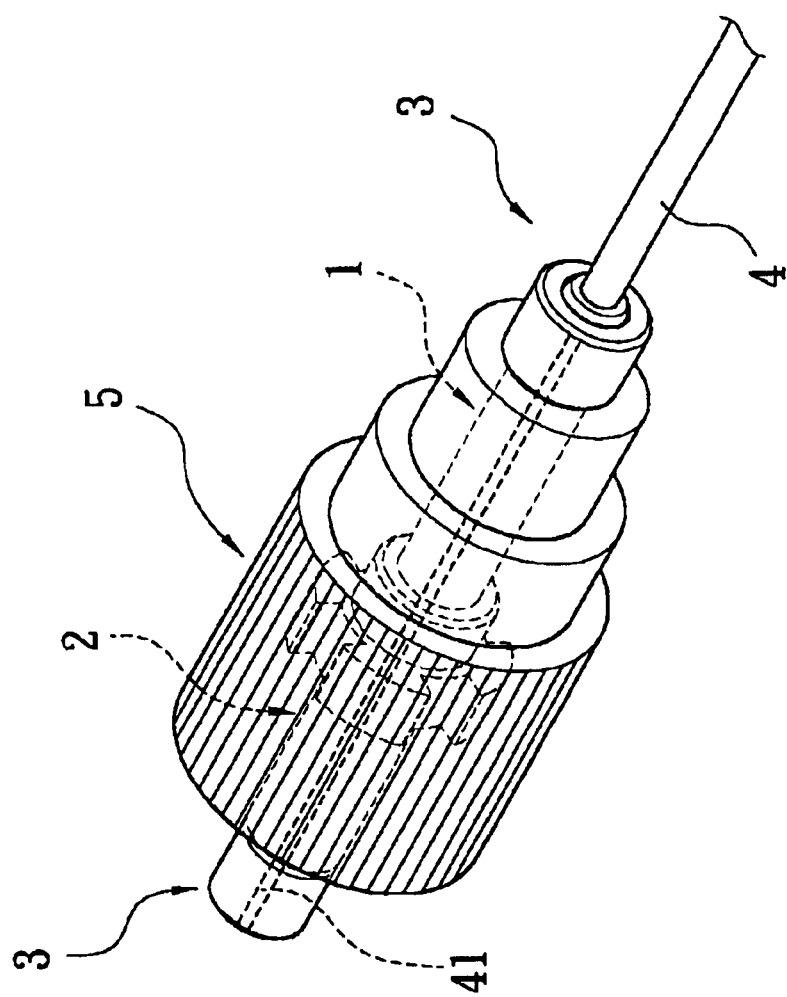
FIG. 5 is a perspective view showing the application of the optical fiber connector of the present invention.

With reference to FIG. 5, after the filament (41) is received in the optical fiber connector of the present invention, other device (5) may be employed to the combination to complete the designed function.

Figure 6:
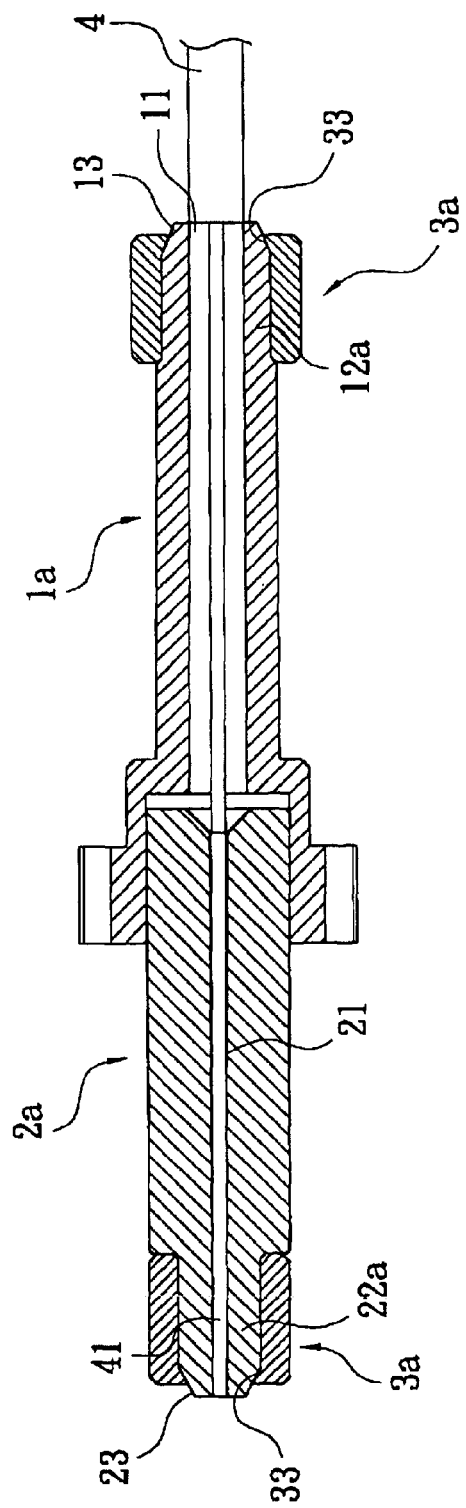
FIG. 6 is a cross sectional view of another embodiment of the optical fiber connector of the present invention.

With reference to FIG. 6, the connection between the retaining element (3) and the first elongated portion (1) and the second elongated portion (2) may be completed without the requirement of the threading in the first elongated portion (1), the second elongated portion (2) and the retaining element (3). That is, the connection between the retaining element (3) and the first elongated portion (1) and the second elongated portion (2) may be completed by supersonic welding to securely engage the retaining element (3) with the first elongated portion (1) and the retaining element (3) with the second elongated portion (2).

By way of the structure of the optical fiber connector of the present invention, adhesion is no longer required such that situations such as stain or deviation of the filament (41) is obviated. In the meantime, manufacture cost is also reduced.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical fiber connector comprising:
   a first elongated portion with a first conical head formed on a first distal end of the first elongated portion and a first through hole;
   a second elongated portion having a first distal end securely received in the first elongated portion, a second through hole defined to correspond to and communicate with the first through hole of the first elongated portion after the first distal end of the second elongated portion is received in the first elongated portion and a second conical head formed at a second distal end of the second elongated portion;
   two retaining elements each being hollow to receive therein the first conical head and the second conical head and having a tapered through hole to respectively correspond to the first conical head and the second conical head so that after the first conical head and the second conical head are respectively in a corresponding one of the two retaining elements, a diameter of the first through hole and a diameter of the second through hole are reduced so that a filament of an optical fiber is able to be securely retained inside the first and second through holes.

2. The optical fiber connector as claimed in claim 1, wherein the first elongated portion has a receiving space defined at a second distal end of the first elongated portion to receive therein the first distal end of the second elongated portion.

3. The optical fiber connector as claimed in claim 1, wherein a first outer threading is formed on an outer periphery of the first distal end of the first elongated portion, a second outer threading is formed on an outer periphery of the second distal end of the second elongated portion and each retaining element is provided with an inner threading corresponding to the first and second outer threading of the firs and second elongated portions such that the retaining elements are able to be securely connected to the first elongated portion and the second elongated portion.

4. The optical fiber connector as claimed in claim 2, wherein a first outer threading is formed on an outer periphery of the first distal end of the first elongated portion, a second outer threading is formed on an outer periphery of the second distal end of the second elongated portion and each retaining element is provided with an inner threading corresponding to the first and second outer threading of the firs and second elongated portions such that the retaining elements are able to be securely connected to the first elongated portion and the second elongated portion.

* * * * *